US005671149A

United States Patent [19]

Brown

[11] Patent Number: 5,671,149

[45] Date of Patent: Sep. 23, 1997

[54] PROGRAMMABLE BOARD MOUNTED VOLTAGE REGULATORS

[75] Inventor: Alan E. Brown, Georgetown, Tex.

[73] Assignee: Dell USA, L.P., Round Rock, Tex.

[21] Appl. No.: 371,234

[22] Filed: Jan. 11, 1995

[51] Int. Cl.$^{6}$ .................................................... G05B 11/01

[52] U.S. Cl. .......................... 364/483; 323/282; 323/283; 364/183

[58] Field of Search .................................... 323/282, 283; 364/152, 183, 483

[56] References Cited

U.S. PATENT DOCUMENTS

| | | | |
|---|---|---|---|
| 3,125,715 | 3/1964 | Brooks | 323/279 |
| 3,577,064 | 5/1971 | Nercessian | 323/275 |
| 4,569,009 | 2/1986 | Genuit | 363/28 |
| 4,646,218 | 2/1987 | Scholer | 363/21 |
| 4,752,699 | 6/1988 | Cranford, Jr. et al. | 327/100 |
| 4,994,685 | 2/1991 | Mathison | 307/66 |
| 5,063,304 | 11/1991 | Iyengar | 327/310 |
| 5,177,431 | 1/1993 | Smith et al. | 323/349 |
| 5,220,272 | 6/1993 | Nelson | 323/282 |
| 5,300,824 | 4/1994 | Iyengar | 327/540 |
| 5,444,298 | 8/1995 | Schutz | 257/691 |
| 5,490,057 | 2/1996 | Vinciarelli et al. | 364/183 X |

*Primary Examiner*—Edward R. Cosimano
*Attorney, Agent, or Firm*—Skjerven, Morrill, MacPherson, Franklin & Friel; Stephen A. Terrile

[57] ABSTRACT

A programmable resistive network coupled between the regulated output voltage and an error amplifier of a feedback circuit for adjusting the operating voltage for desired performance of a replaceable device. The replaceable device is preferably connected using a ZIF socket to facilitate removal and replacement. In a first embodiment, the resistive network includes a resistor pack having a resistive ratio corresponding to a replaceable device. In a second embodiment, the resistive network includes a mounted programmable potentiometer which is programmed to a new value when the device is replaced or upgraded. In a third embodiment, the resistive network comprises laser trimmed silicon resistors mounted on the same silicon die as the replaceable device, where the silicon resistors are laser trimmed when the device is fabricated. A junction of the silicon device is provided through an external pin to the feedback error amplifier. Again, the resistive ratio of the silicon resistors corresponds to the desired operating voltage of the device.

20 Claims, 2 Drawing Sheets

PROGRAMMABLE BOARD MOUNTED VOLTAGE REGULATORS

FIELD OF THE INVENTION

The present invention relates to programmable voltage regulators, and more particularly to board mounted programmable voltage regulators for modifying the operating voltage provided to replaceable and upgradeable system components, such as the microprocessor of a computer system.

DESCRIPTION OF THE RELATED ART

It is becoming more common in the personal computer industry to provide families of higher performance devices that are interchangeable using a common planar socket. High performance devices other than the microprocessor are contemplated, although the microprocessor is the most likely candidate for upgrades and will be used for purposes of the present disclosure. A family of microprocessors allows a user or manufacturer to tailor the capabilities and cost for a given system, where each particular microprocessor varies in capability, power requirements, speed, etc. Pentium microprocessors by Intel, for example, include family members P54, P54C, P54CT, etc. which vary in terms of operating voltage, speed, etc., although most or all devices of a given family generally maintain pin for pin compatibility. A zero-insertion force (ZIF) socket is mounted to the planar or system board for easy removal and replacement of the device. Similar families are also expected for other microprocessors, such as the P6 by Intel the K5 by Advanced Micro Devices, the Power PC 601, 603, 604, 620, etc. by IBM and Motorola, the T5 by Mips Technologies, etc. Thus, the system board is configurable using a ZIF socket for receiving any one member of several family members of devices or the system board is easily upgraded by replacing the original device in the ZIF socket with a higher performance, yet pin-compatible device.

It is known, however, that different members of a family of devices often require different operating voltages depending upon the desired speed and functionality. At the present time, standard operating voltages of 5 volts and 3.3 volts are established, although other standard voltage levels are contemplated. Furthermore, the optimal operating voltage may also vary significantly from the nominal operating voltage due to process limitations and variations. For example, a device intended to have a nominal operating voltage of 3.3 volts may operate at an optimal level of 3.5 volts or anywhere between 3 to 4 volts, depending upon the specific process limitations and variations while fabricating a particular microprocessor.

It is known that Intel is attempting to establish the use of replaceable voltage regulator modules. Such modules would provide a means of programming the optimal operating voltage for each specific device. However, replaceable regulators would require significant expense for the initial system as well as future upgrades of the computer system. Therefore, it is desirable to provide a relatively inexpensive method for programming the correct operating voltage for replaceable families of devices on common planar sockets.

SUMMARY OF THE PRESENT INVENTION

A system according to the present invention provides a relatively simple and inexpensive method of programming the operating voltage for replaceable devices, such as microprocessors on computer systems. In a system according to the present invention, a voltage regulator circuit including a regulator and an error amplifier is mounted on the planar system board. The regulator receives a DC source signal and an adjust signal from the error amplifier and provides the regulated operating voltage to the replaceable device. The error amplifier receives a reference voltage at one input, which is typically about 2.5 volts, and a feedback signal from a second input. According to the present invention, a programmable resistive network is coupled between the regulated output operating voltage and the second input of the error amplifier for adjusting the operating voltage through the feedback circuit according to the resistive network. Three separate embodiments for programming the feedback resistor network are disclosed.

According to a first embodiment, a separate user-replaceable resistor pack is provided for each particular operating voltage. The resistor pack may be fabricated in any convenient form, such as an 8-pin dual in-line package (DIP) for plugging into a corresponding socket mounted to the system board. The replaceable resistor pack includes resistive devices for coupling between the output of the regulator and ground having a junction forming a voltage divider of the regulated voltage for providing a proportional signal to the error amplifier. The particular ratio of the resistive elements determines the operating voltage. Although this method requires that the resistor pack be replaced along with the new device, replacing the resistor pack is significantly less expensive than replacing the entire regulator.

In a second embodiment according to the present invention, a resistor and a programmable potentiometer or EEPOT are mounted between the output voltage and ground, where the junction between the resistor and the EEPOT provides the proportional feedback signal In this manner, the EEPOT is programmed to a specific resistance value for determining the resistance ratio between the EEPOT and the resistor for defining the operating voltage provided from the regulator. Furthermore, firmware support and specific data from the selected device preferably programs the particular resistive value of the EEPOT at power up to adjust operating voltage to the desired level. In this embodiment, a separate device need not be replaced when the device is upgraded or otherwise replaced.

In a third method according to the present invention, the resistive network is placed on the same silicon die as the device itself. The silicon resistors are functionally laser trimmed or "Zener-zapped" at the wafer or die level to assure the correct operating voltage. In this manner, the device provides part of the feedback circuit for defining its own operating voltage so that only the device itself need be replaced.

In any of the methods described above, the exact feedback resistance values of the resistive network is less important than their resistive ratios. The ratio defines the appropriate amount of voltage division for programming the operating voltage level. It is clear that in any of the methods disclosed above, only the resistive feedback portion of the regulator circuit is programmed since the remaining portion of the regulator is already mounted on the board. A system according to the present invention, therefore, substantially reduces the cost for the initial system and any upgrades.

BRIEF REVIEW OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
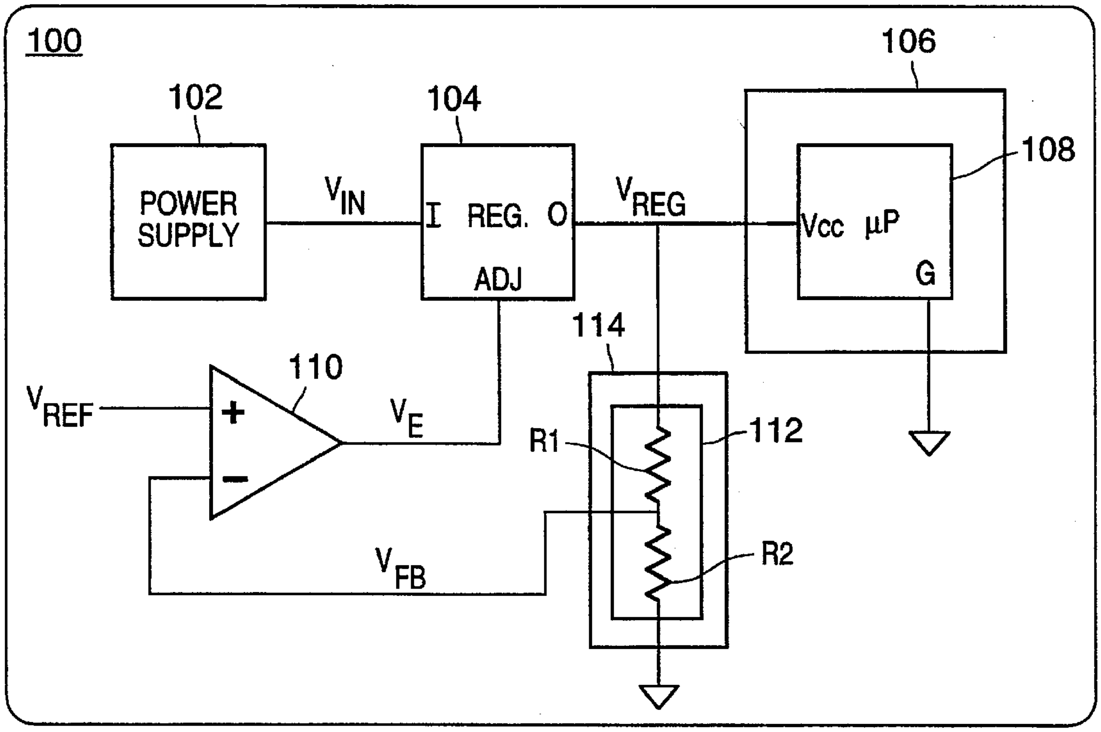
FIG. 1 is a schematic diagram illustrating one embodiment of the present invention.

Referring now to FIG. 1, a schematic diagram is shown of one embodiment according to the present invention. The planar or system board 100 of a computer system is shown with several mounted devices according to the present invention. A power supply 102 generally receives an unregulated AC or DC voltage and provides a plurality of DC voltage levels sufficient for powering the computer system. The power supply 102 may be mounted on the system board 100, although it is typically provided as a separate component where the power voltages are routed to the system board 100 through cables or other conductors as known to those skilled in the art. The power supply 102 provides an input voltage referred to as $V_{IN}$ which is typically about 5 volts. The $V_{IN}$ signal is provided to the input of an adjustable voltage regulator 104, such as the LM317 by National Semiconductor, or any other similar type regulator as known to those skilled in the art. The regulator 104 includes an adjust terminal for receiving an error signal $V_E$ for regulating its output voltage $V_{REG}$ according to the error signal $V_E$. The $V_{REG}$ signal is provided to one pin or input of a planar socket 106, which is mounted to the system board 100 and includes individual pin sockets for receiving the pins of a microprocessor 108. The $V_{REG}$ signal is provided to the power input pin (VCC) of the microprocessor 108, and therefore is the operating voltage of the microprocessor 108. The planar socket 106 is preferably a zero insertion force (ZIF) socket for easy removal and replacement of the device mounted thereon, which includes the microprocessor 108 or one of its family members.

The error signal $V_E$ is asserted by an error amplifier 110 which receives a reference voltage $V_{REF}$ at one input and a feedback voltage $V_{FB}$ at its other input for determining the voltage of the error signal $V_E$. In the present embodiment, a resistor pack 112 is plugged into a corresponding socket 114 to complete the circuit. The resistor pack 112 preferably includes resistive elements including a resistor R1 having one end for coupling through a corresponding conductor of the socket 114 to the $V_{REG}$ signal and its other end for coupling to one end of a second resistive element R2. The other end of the resistive element R2 is coupled through a corresponding conductor of the socket 114 to ground. The junction between the resistors R1, R2 comprises a third terminal of the resistor pack 112, which is provided through a third conductor of the socket 114 to provide the $V_{FB}$ signal.

The ratio of the resistive elements R1, R2 is selected to divide the regulated output voltage $V_{REG}$ to correspond with the reference voltage $V_{REF}$, which is preferably approximately 2.5 volts, although other reference voltages are contemplated. The resistance values of the resistors R1, R2 are selected to reduce current flow to a negligible level to reduce power loss to an acceptable level. In operation, if the operating voltage $V_{REG}$ attempts to change according to current demands by the microprocessor 108, the $V_{FB}$ varies proportionally and the error amplifier 110 asserts the $V_E$ signal to the voltage regulator 104 to oppose the change of the $V_{REG}$ signal. Thus, the $V_{REG}$ signal is maintained or regulated at the desired voltage level.

For example, if the $V_{REG}$ signal is intended to be 5.0 volts, the resistance of the resistors R1 and R2 are selected to be equal within an acceptable tolerance so that the $V_{FB}$ signal is divided to 2.5 volts to maintain the $V_{REG}$ signal at 5 volts. In this manner, any variations of the $V_{IN}$ signal do not affect the operating voltage $V_{REG}$ supplied to the microprocessor 108. Alternatively, if the $V_{REG}$ signal is intended to be 3.3 volts, the ratio of the resistances of R2 divided by R1 is preferably approximately 3.125 to maintain $V_{REG}$ at 3.3 volts, assuming that $V_{REF}$ is approximately 2.5 volts.

The resistor pack 112 is preferably in any form convenient for the user, such as an 8-pin dual in-line package (DIP) as known to those skilled in the art. Thus, anytime the user replaces the microprocessor 108 with a pin-pin compatible microprocessor, the user would correspondingly replace the resistor pack 112 to correspond with the new microprocessor. For example, if the microprocessor 108 requires a voltage of 5 volts, it has a corresponding resistor pack 112 having resistance values R1 equal to R2. A new microprocessor requiring a voltage of 3.3 volts includes a corresponding resistor pack 112 having resistance values R1, R2 such that R2 divided by R1 equals 3.125. It is seen that the simple replacement of the resistor pack 112 with the corresponding replacement of the microprocessor provides a simple and relatively inexpensive method to upgrade or otherwise replace the microprocessor 108 as desired.

Figure 2:
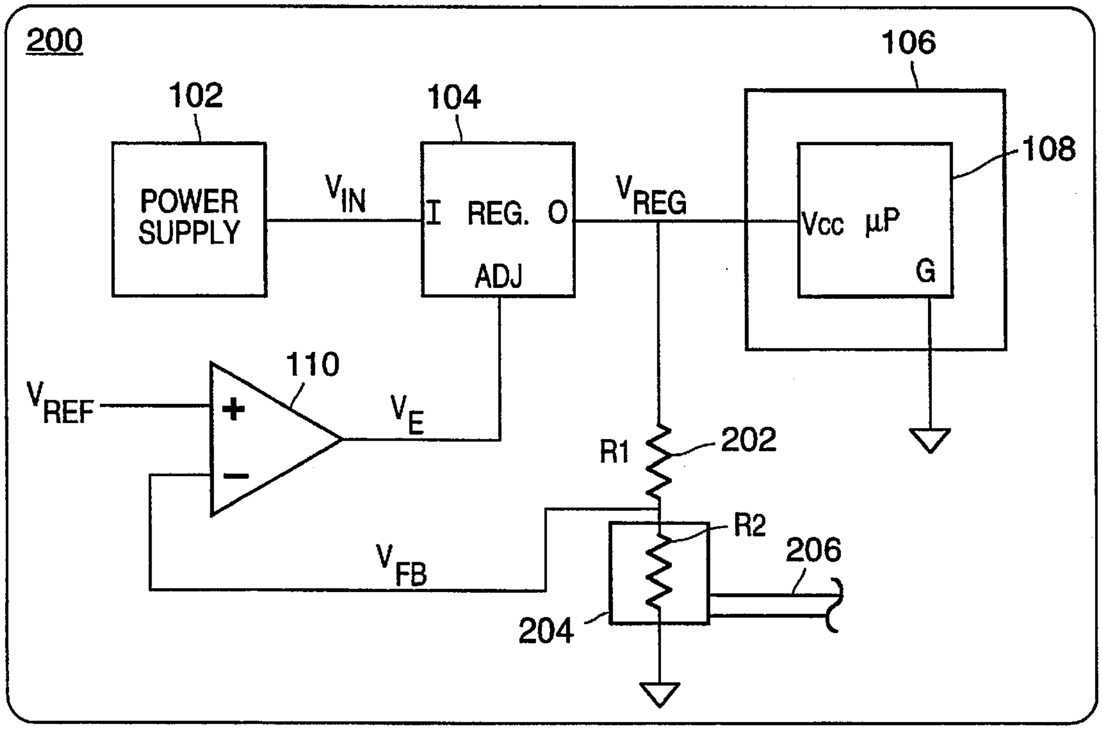
FIG. 2 is a schematic diagram illustrating another embodiment of the present invention.

Referring now to FIG. 2, a schematic diagram is shown of another embodiment according to the present invention. A similar system board 200 is shown having similar components mounted thereon, where similar devices retain identical reference numerals for simplicity. Thus, the power supply 102, the regulator 104, the planar socket 106, the microprocessor 108 and the error amplifier 110 are shown. In this embodiment, however, a resistor 202 having a resistance R1 is preferably mounted to the system board 200 between the output of the regulator 104 and the negative input of the error amplifier 110. An electrically programmable potentiometer (EEPOT) 204 is mounted on the system board 200 and connected between one end of the resistor 202 providing the $V_{FB}$ signal and ground. The resistance R2 of the EEPOT 204 may be programmed using any one of a number of methods. In the preferred embodiment, firmware and corresponding data are provided by the microprocessor 108 to program the EEPOT 204 through a data bus 206. The data bus 206 may be a parallel bus, but is preferably a serial bus for programming the EEPOT 204. The EEPOT 204 is programmed to modify the ratio of its resistance R2 relative to the resistance R1 of the resistor 202 to regulate the $V_{REG}$ signal in a similar manner as described alone using the resistor pack 112. It is noted that since the EEPOT 204 is preferably mounted to the planar board 200, that the microprocessor 108 is the only component that need be replaced.

The EEPOT 204 is preferably initially set at a nominal resistance value allowing at least acceptable operation of the microprocessor 108 to allow power up. The microprocessor 108 boots up and executes start up routines typically within a system ROM or similar type device (not shown), which is used to program the EEPOT 204 to the appropriate value for maximum performance. The actual value is predetermined and preferably stored within the microprocessor 108 itself, such as in resident firmware (ROM) or the like, where a new replacement microprocessor stores a different value for corresponding to its optimal operating voltage level. It is noted that the operating voltage of the system board 200 supplied by the power supply 102 may be designed to ramp up until the microprocessor 108 receives sufficient operating voltage. Then the microprocessor 108 programs the EEPOT 204 to the optimal voltage level. Such operation would prevent a lower voltage device from receiving excessive voltage during power-up.

Figure 3:
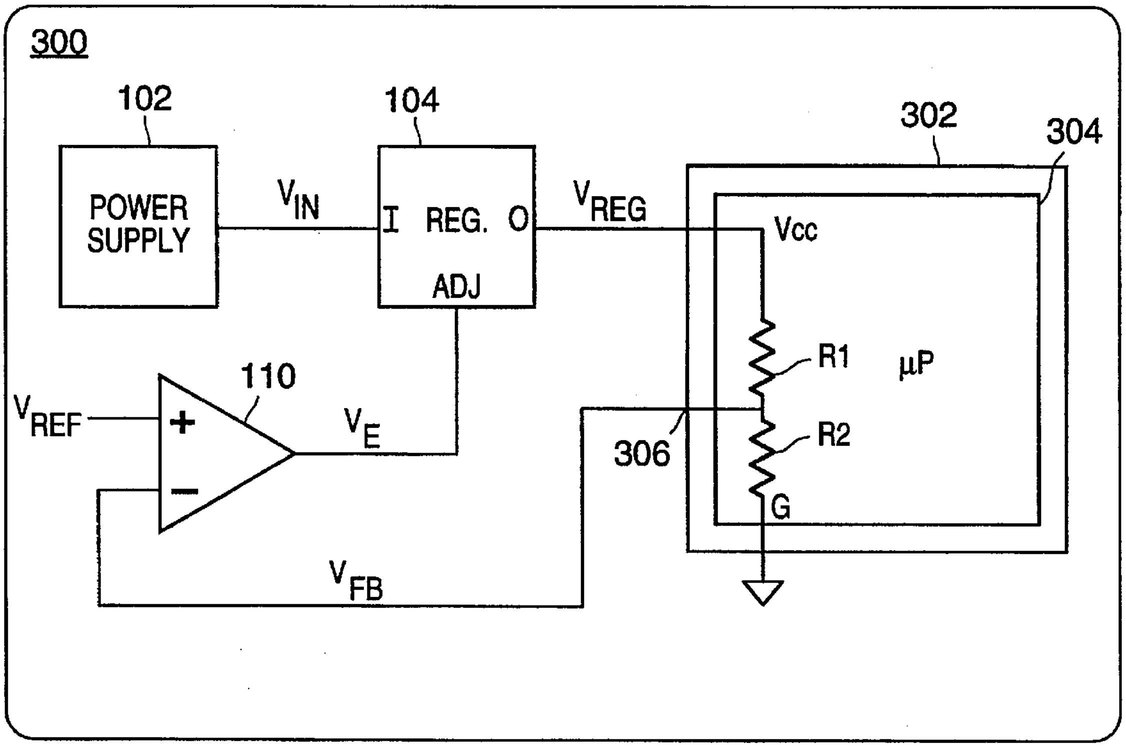
FIG. 3 is a schematic diagram illustrating yet another embodiment of the present invention.

Referring now to FIG. 3, a schematic diagram is shown of yet another embodiment according to the present invention. Again, a similar system board 300 is shown having similar components which assume identical reference numerals including the power supply 102, the voltage regulator 104 and the error amplifier 110. In this embodiment, however, a ZIF socket 302 mounted on the system board 300 includes an output pin 306 for providing the $V_{FB}$ signal to an input of the error amplifier 110. In this embodiment, two resistors R1 and R2 are provided on the same die or wafer of a microprocessor 304, which is plugged into the ZIF socket 302. The resistors R1, R2 are preferably functionally laser trimmed or "Zener-zapped" at the wafer level according to the optimal operating voltage of the microprocessor 304. The resistors R1, R2 are thus programmed during fabrication of the microprocessor 304 for optimal performance. It is noted that the values of the resistors R1, R2 are not necessarily tightly controlled, but that their ratio is controlled to within a desirable tolerance level. Again the more important parameter is the ratio of the resistors R1, R2. The resistors R1, R2 are coupled in series between the $V_{REG}$ signal and ground when the microprocessor 304 is plugged into the ZIF socket 302. The junction between the resistors R1, R2 is connected to an external pin of the microprocessor 304, which is further coupled through the output 306 of the ZIF socket 302 for providing the $V_{FB}$ signal.

In this manner, it is clear that a separate replaceable or programmable element is not required since provided within the microprocessor 304, or within any replacement microprocessor. Again, the resistors R1, R2 divide the $V_{REG}$ signal to the desired voltage level of the $V_{RF}$ signal, which again is preferably 2.50 volts.

It is therefore appreciated that a programmable resistive network according to the present invention for coupling to a feedback circuit mounted to the system board defines the appropriate mount of voltage division of the sensed operating voltage for a replaceable device. Only the resistive network need be programmed or otherwise replaced when replacing the target device, thereby substantially reducing initial costs and any upgrade costs.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. An electronic device comprising:

a system board for mounting and electrically connecting electronic devices;

a socket mounted to said system board for receiving and replaceably connecting a selected one of a plurality of devices;

means for providing a source voltage;

a regulator mounted to said system board receiving said source voltage and receiving an error signal, the regulator for, providing an operating voltage to said replaceably connected one of a plurality of devices;

means for providing a reference voltage;

an error amplifier receiving said reference voltage and receiving a feedback signal, the error amplifier for providing said error signal; and a modifiable resistive network coupled to said regulator and coupled to said error amplifier, the resistive network being modified in conjunction with and depending upon the selected replaceable one era plurality of devices, the resistive network for sensing said operating voltage and providing said feedback signal to maintain said operating voltage at a determined optimum level.

2. The electronic device of claim 1, wherein said one of a plurality of devices is a microprocessor.

3. The electronic device of claim 1, wherein said plurality of devices comprises a family of pin-compatible devices.

4. The electronic device of claim 1, wherein said socket comprises a zero-insertion force type socket.

5. The electronic device of claim 1, wherein said regulator is an adjustable voltage regulator.

6. The electronic device of claim 1, wherein the modifiable resistive network comprises:

a second socket; and a resistor divider removably coupled to said second socket including plurality of resistors for coupling between said regulator and ground and having a junction for providing said feedback signal, wherein the ratio of resistive values of said resistor divider corresponds to the operating voltage of the selected replaceable one of a plurality of devices.

7. The electronic device of claim 6, wherein said resistor divider is provided on a dual in-line package for plugging into said second socket.

8. The electronic device of clam 1, wherein:

the modifiable resistive network includes a plurality of laser-trimmed silicon resistors mounted with the selected replaceable one of a plurality of devices, the plurality of laser-trimmed silicon resistors having a junction for providing said feedback signal and having a ratio of silicon resistor resistances corresponding to the operating voltage of the selected replaceable one of a plurality of devices; and said socket having a conductor for connecting said silicon resistor junction to said error amplifier.

9. The electronic device of claim 8, wherein the silicon resistors are on the same silicon die as the selected replaceable one of a plurality of devices and the silicon resistors are laser-trimmed during the fabrication of the selected replaceable one of a plurality of devices.

10. The electronic device of claim 1, wherein the modifiable resistive network comprises:

a first resistor molted to said system board and coupled between said regulator and said error amplifier; and a programmable resistor mounted to said system board and coupled between said first resistor and ground and receiving a digital signal for programming the programmable resistor resistance;

wherein the selected replaceable one of a plurality of devices programs said programmable resistor so that the ratio of said resistance of the programmed resistor and said first resistor corresponds to the determined optimal level of operating voltage.

11. The electronic device of claim 10, wherein the selected replaceable one of a plurality of devices includes firmware for storing a value for programming said programmable resistor.

12. The electronic device of claim 10, wherein said programmable resistor comprises an EEPOT.

13. A system board for a computer system for receiving and electrically connecting a selected replaceable one of a plurality of interchangeable devices comprising:

a socket for receiving and electrically and replaceably connecting a selected replaceable one of the devices;

a regulator receiving a source voltage and receiving an error signal, the regulator for providing an operating voltage to the selected replaceable one of the devices;

an error amplifier receiving a reference voltage and receiving a feedback signal the error amplifier for providing said error signal; and a modifiable resistive network coupled to said regulator and coupled to said error amplifier, the resistive network being modified in conjunction with and depending upon the selected replaceable one of a plurality of devices, the resistive network for sensing said operating voltage and providing said feedback signal to maintain said operating voltage at a determined optimum level.

14. The system board of claim 13, wherein the plurality of interchangeable devices comprises a family of microprocessors.

15. The system board of claim 13, wherein the modifiable resistive network comprises:

a second socket; and a resistor divider removably coupled to said second socket including a plurality of resistors for coupling between said regulator and ground and having a junction for providing said feedback signal, wherein the ratio of resistive values of said resistor divider corresponds to the operating voltage of the selected replaceable one of the devices.

16. The system board of claim 13, further comprising:

the modifiable resistive network includes a plurality of laser-trimmed silicon resistors mounted on the selected replaceable one of the devices, the plurality of laser-trimmed silicon resistors having a junction for providing said feedback signal and having a ratio of silicon resistor resistances corresponding to the operating voltage of the selected replaceable one of a plurality of devices; and said socket having a conductor for connecting said silicon resistor junction to said error amplifier.

17. The system board of claim 16, wherein the silicon resistors are provided on the selected replaceable one of the devices and the silicon resistors are laser-trimmed during the fabrication of the selected replaceable one of the devices.

18. The system board of claim 13, wherein the modifiable resistive network comprises:

a first resistor mounted to said system board and coupled between said regulator and said error amplifier; and a programmable resistor mounted to said system board and coupled between said first resistor and ground and receiving a digital signal for programming the programmable resistor resistance;

wherein the selected replaceable one of the devices programs said programmable resistor so that the ratio of said resistance of the programmed resistor and said first resistor corresponds to the determined optimal level of operating voltage.

19. The system board of claim 18, wherein the selected replaceable one of the devices includes firmware for storing a value for programming said programmable resistor.

20. The system board of claim 18, wherein said programmable resistor comprises an EEPOT.

* * * * *